United States Patent Office 3,241,950
Patented Mar. 22, 1966

3,241,950
AQUEOUS ACID OXIDATION OF COPPER
BEARING MINERAL SULPHIDES
Vladimir Nicolaus Mackiw and Herbert Veltman, Fort Saskatchewan, Alberta, Canada, assignors to Sherritt Gordon Mines Limited, Toronto, Ontario, Canada, a company of Canada
No Drawing. Filed Feb. 13, 1963, Ser. No. 258,133
7 Claims. (Cl. 75—117)

This invention relates to the hydrometallurgical production of copper, and more particularly, it is concerned with a hydrometallurgical process for the extraction of copper from chalcocite ores and concentrates which contain iron in the form of pyrite.

In the main, copper sulphide bearing ores presently treated for the recovery of copper contain a relatively small amount of copper, usually less than 2 weight percent, and direct metallurgical treatment of these ores for recovery of the contained copper is generally not feasible. These ores must therefore be upgraded by ore beneficiation procedures, such as flotation, to produce a concentrate from which the copper can be economically recovered by metallurgical methods.

The metal sulphides content of the ore can be separated from the gangue material by means of flotation techniques to yield a bulk concentrate and, in most cases, the bulk concentrate can be further treated by flotation to separate the copper sulphide and iron sulphide fractions. However, in some cases, copper sulphide ores, including some chalcocite ores, yield bulk concentrates which cannot be separated or are only partially separable, into copper sulphide and iron sulphide fractions by means of flotation. This results, in most cases, when the copper and iron sulphides are highly disseminated in the ore, and conventional grinding does not effectively free the individual metal sulphide mineral particles for contact with the wetting or frothing agent as the case may be. Exceedingly fine grinding of the ore to effectuate liberation of the metal sulphides is not practical because of the high cost involved and, in addition, froth flotation is generally ineffective for treating very fine material. Accordingly, bulk concentrates of this nature must be treated directly by metallurgical means for the recovery of copper.

The treatment of such bulk concentrates by known pyrometallurgical methods presents a problem in that the presence of the high iron sulphide fraction will generally necessitate a partial roasting step to remove a portion of the sulphur. In addition, the usual matting steps become more tedious and costly because of the large amounts of iron and sulphur which must be removed.

It is also known that copper sulphide concentrates of this nature can be treated hydrometallurgically for the recovery of copper by leaching with an aqueous ammoniacal solution at elevated temperature and pressure and in the presence of a free oxygen bearing gas. However, this method results in the extraction of a substantial amount of sulphur and, therefore, it is unsuitable for applications where the consumption of ammonia and the necessity to dispose of the sulphur (as $(NH_4)_2SO_4$) are considered serious disadvantages.

Acid leaching techniques have heretofore been found generally unsatisfactory in the treatment of copper sulphide concentrates because of slow reaction rates, and incomplete extraction of the copper.

We have found a simple and economic hydrometallurgical method by which copper can be selectively extracted from sulphide concentrates composed of mixtures of chalcocite and pyrite without accompanying extraction of any appreciable amount of sulphur or iron. Thus, the problems relating to sulphur removal and/or disposal are avoided. The process is, therefore, particularly applicable to the treatment of chalcocite ores which contain a high fraction of pyrite which is not economically separable from the chalcocite by flotation means. It will be understood, however, that the process of this invention is not necessarily limited to this type of material alone.

In carrying out the method of this invention, copper concentrates consisting of a mixture of chalcocite, $Cu_2S$, and pyrite, $FeS_2$, are leached in an aqueous sulphuric acid solution containing at least about 1 mole of sulphuric acid per mole of copper at elevated temperatures and in the presence of a free oxygen bearing gas. The concentrate is leached until at least about 95 percent of the copper is extracted. The leach solution is separated from the undissolved residue and the copper recovered from the solution by conventional procedures, such as electrolysis or hydrogen reduction, for example. The end solution containing regenerated sulphuric acid can be recycled to the oxidation leach stage.

We have found that under these conditions, the $Cu_2S$ is preferentially oxidized at a rapid rate with very little oxidation of the pyrite occurring until at least about 95 percent of the copper is in solution. The sulphur bound to copper is converted to elemental sulphur and the pyrite remains essentially unattacked by the leach solution. Thus, by proper control of the leaching time, substantially all the copper is selectively extracted from the concentrate leaving essentially all the sulphur and iron in the residue.

The process can be conducted on a cyclic basis with barren solution containing acid regenerated in the copper removal step continually re-cycled to the oxidizing leach step.

More specifically, in the present invention, the starting material consists of a copper sulphide concentrate comprised of a mixture of chalcocite, $Cu_2S$, and pyrite, $FeS_2$. These minerals need not be present in any particular ratio; however, as stated above, concentrates containing a high fraction of pyrite, in the order of 50 wt. percent or more, for example, can be treated with particular advantage by the method of this invention.

Preferably, the concentrate is ground to substantially 100% minus 325 mesh Standard Tyler screen and passed to a leaching vessel which is suitably lined to resist corrosion. Coarser material may be treated, but the total time required for the oxidizing leach increases as the particle size increases. In the leaching vessel, the starting material is slurried with an aqueous sulphuric acid solution which contains one mole of $H_2SO_4$ per mole of copper present in the charge. There is no advantage in adding acid in excess of this amount as it does not increase the rate of reaction or improve the extraction of copper. The pulp density of the slurry is determined by the final copper concentration desired in the leach solution. In most cases, a copper concentration of about 50 to about 120 grams per litre is satisfactory.

Oxidizing conditions in the leaching step are produced by contacting the solution with an oxidizing gas such as oxygen, oxygen enriched air, or air alone. An oxygen overpressure is maintained in the range of about 5 pounds per square inch gauge (p.s.i.g.) to about 100 p.s.i.g. and preferably about 50 p.s.i.g. Higher pressures can, of course, be used but they apparently do not aid in the preferential oxidation of the copper sulphide to the extent which justifies the resultant increase in apparatus requirements and overhead costs. Lower pressures increase the leaching period and do not appreciably improve the selectivity of the leach.

The leaching temperature is below the melting point of sulphur. Preferably, it is in the range of from about 175° F. to about 225° F. Lower temperatures can be used, but the reaction rate is slowed considerably at these temperatures, and economics of the overall process will generally not favour temperatures below 175° F. If temperatures below the boiling point of the slurry are used, it is possible to conduct the leach in an open vessel such as a wooden pachuca-type tank. However, under these conditions, it is not possible to maintain the optimum oxygen overpressure, and oxidation proceeds very slowly as the oxidizing gas is merely injected and released into the atmosphere. For example, it was found that after 6 hours of leaching at 175° F. at atmospheric pressure with the injection of oxygen into the bottom of the open vessel, only 65% of the copper was oxidized.

The leaching is conducted until the major portion of the $Cu_2S$ is oxidized. We have found that the $Cu_2S$ will be selectively oxidized at a rapid rate until at least about 95% of the copper contained in the charge is extracted and the sulphur bound to it is converted to elemental sulphur. If the oxidation is continued beyond this point, iron and sulphur will begin to go into solution as a result of the oxidation of the pyrite. The optimum leaching time for a particular concentrate will depend on the composition of the concentrate, the particle size of the material, and the temperature and pressure at which the leaching is conducted. Generally speaking, the rate of copper extraction drops very rapidly after the optimum point is reached, and it is thus a simple matter, for one ordinarily skilled in the art, to determine, by observation, the optimum leaching time for a particular material under a given set of leaching conditions.

The invention as described herein is based on actual observation and is entirely free of hypothetical considerations. It is believed, however, that the following is a reasonable explanation of the mechanism of the oxidation step: The $Cu_2S$ reacts preferentially with the sulphuric acid to form $CuSO_4$ and elemental sulphur according to:

(1) 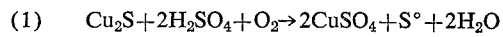
$$Cu_2S + 2H_2SO_4 + O_2 \rightarrow 2CuSO_4 + S° + 2H_2O$$

After the acid is consumed the $FeS_2$ is oxidized according to:

(2) 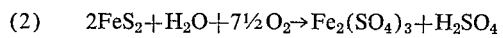
$$2FeS_2 + H_2O + 7\tfrac{1}{2}O_2 \rightarrow Fe_2(SO_4)_3 + H_2SO_4$$

These reactions show that it is important to maintain leaching conditions that will promote reaction (1) and will suppress reaction (2). In actual practice, however, regardless of the exact leaching conditions, the two reactions "overlap" to some extent, and it is not possible to obtain complete extraction of copper without at least some oxidation of the pyrite taking place. Nonetheless, we have found that under the leaching conditions set out herein, at least 95% of the copper is preferentially oxidized before any substantial amount of the pyrite is oxidized. As a result, by terminating the leaching at the proper point substantially all of the copper is removed and little sulphur and iron is extracted.

At the completion of the leaching stage, the pregnant leach solution is separated from the undissolved residue, such as by filtration, and is passed to the copper recovery step. If desired, the leach residue can be treated, such as by flotation, to recover the elemental sulphur produced during the oxidizing leach. The copper may be recovered by conventional methods, such as by electrolysis or by reduction with hydrogen at elevated temperature and pressure. In either case, 1 mole of sulphuric acid is generated for each mole of copper recovered; and thus the end solution, which contains the required acid, can be recycled directly to the leaching stage in a continuous cyclic process. Because a small amount of iron and sulphur are also extracted during the leaching step, some provision will be required to prevent a buildup of iron and sulphuric acid in the system. We have found that if the leaching step is properly controlled, the amount of sulphur and iron extracted is small, in the order of 9% by weight or less of the iron and sulphur content of the feed, and thus the removal from the circuit of the small excess of said produced by the sulphur in solution and its disposal is a relatively minor matter in comparison to the large volumes of sulphur or sulphuric acid requiring disposal in the prior art processes.

The following examples illustrate the operation of the present invention in practice:

EXAMPLE 1

A copper sulphide concentrate having the following composition was treated:

|  | Percent |
|---|---|
| Cu | 23.0 |
| Fe | 28.2 |
| $S_T$ | 39.0 |
| $SiO_2$ | 7.0 |

This analysis indicated the following mineralogical composition:

|  | Percent |
|---|---|
| $Cu_2S$ | 28.8 |
| $FeS_2$ | 60.4 |
| $SiO_2$ | 7.0 |
| Misc. | 3.8 |

This concentrate was ground to 99.0% minus 325 mesh Standard Tyler screen. Six 450 gram samples of the ground concentrate were leached in a titanium lined autoclave for various periods of time.

Each sample was slurried in 1500 ml. of water containing 168 grams of 95% $H_2SO_4$ (i.e., 1 mole per mole of copper in the charge).

In all tests, the temperature was maintained at 225° F. and an oxygen overpressure of 50 p.s.i. was applied. A pulp density of 300 g.p.l. was selected to give a copper concentration of 69 g.p.l. at 100% extraction. Each sample was leached for the selected time, the solution was cooled, discharged, and filtered. The solution and residue were analyzed. The results are shown in Table 1.

Table 1

| Leaching time, hours | Leaching product | Quantity | Analysis Cu | Analysis Fe | Analysis $S_t$ | S°, percent | $H_2SO_4$, g.p.l. | pH | Extractions, percent Cu | Extractions, percent Fe | Extractions, percent $S_t$ | Conv. S°, percent |
|---|---|---|---|---|---|---|---|---|---|---|---|---|
| ½ | Solution | 1,500 ml | 49.5 g.p.l. | 3.7 g.p.l. | 41.2 g.p.l. |  | 29 | 0.35 | 71.0 | 4.3 | 4.6 |  |
|  | Residue | 363 gm | 8.3% | 32.9% | 45.6% | 2.6 |  |  |  |  |  | 5.4 |
| 1 | Solution | 1,500 ml | 58.8 g.p.l. | 4.1 g.p.l. | 41.1 g.p.l. |  | 22 | 0.65 | 85.2 | 4.8 | 4.5 |  |
|  | Residue | 337 gm | 4.6% | 34.6% | 44.8% | 2.8 |  |  |  |  |  | 5.3 |
| 2 | Solution | 1,500 ml | 67.0 g.p.l. | 7.5 g.p.l. | 46.0 g.p.l. |  | 15 | 0.7 | 97.3 | 8.8 | 8.7 |  |
|  | Residue | 313 gm | 0.8% | 35.3% | 49.0% | 5.5 |  |  |  |  |  | 9.8 |
| 4 | Solution | 1,500 ml | 68.0 g.p.l. | 17.5 g.p.l. | 59.0 g.p.l. |  | 22 | 0.45 | 99.1 | 20.6 | 19.8 |  |
|  | Residue | 290 gm | 0.3% | 33.8% | 48.2% | 7.1 |  |  |  |  |  | 11.8 |
| 6 | Solution | 1,500 ml | 68.6 g.p.l. | 30.4 g.p.l. | 71.7 g.p.l. |  | 38 | 0.1 | 99.5 | 37.5 | 30.5 |  |
|  | Residue | 252 gm | 0.2% | 31.4% | 48.2% | 10.2 |  |  |  |  |  | 14.7 |
| 10 | Solution | 1,500 ml | 68.0 g.p.l. | 41.0 g.p.l. | 78.7 g.p.l. |  | 112 | 0 | 99.2 | 51.2 | 34.0 |  |
|  | Residue | 225 gm | 0.4% | 27.7% | 48.2% | 14.5 |  |  |  |  |  | 18.5 |

These results clearly indicate that the $Cu_2S$ oxidizes rapidly and preferentially in a short time (2 hours) with only a small amount of accompanying oxidation of the pyrite until the major portion (97.3%) of the copper is extracted. After this point is reached, more and more pyrite is oxidized with only a relatively small increase in copper extraction.

This invention possesses a number of important advantages, particularly in the treatment of chalcocite concentrates containing a large fraction of pyrite. Only a very small amount of the sulphur content of the ore is extracted and dissolved in the solution, thus the acid disposal problem is minimized. The overall process is simple and the capital cost of equipment required to carry out the process is low in comparison to that required for conventional processes. Operating conditions are relatively mild, and oxygen and other reagent requirements are low.

It will be understood, of course, that modifications can be made in the preferred embodiment of the invention described and illustrated herein without departing from the scope of the invention defined by the appended claims.

What we claim as new and desire to protect by Letters Patent of the United States is:

1. The method of recovering copper values from metallic sulphide ore bulk concentrate containing highly disseminated chalcocite and pyrite fractions not readily separable by flotation which comprises the steps of dispersing said concentrate in finely divided form in an aqueous acid leach solution which contains sulphuric acid in an amount at least sufficient to combine with the copper values present in said concentrates to form sulphates; reacting the resultant slurry at a temperature above about 175° F. but below the melting point of sulphur with a free oxygen bearing, oxidizing gas; continuing said reaction with said oxidizing gas to extract copper values contained in said concentrate and convert sulphur bound to said copper values to elemental form; terminating said reaction while substantially all of the pyrite fraction of said concentrate remains unattacked by the leach solution to leave a residue containing elemental sulphur and pyrite; separating the said residue from the leach solution and recovering copper values from said leach solution.

2. The method of recovering copper values from metallic sulphide ore bulk concentrate containing highly disseminated chalcocite and pyrite fractions not readily separable by flotation which comprises the steps of dispersing said concentrate in finely divided form in an aqueous acid leach solution which contains sulphuric acid in an amount at least sufficient to combine with the copper values present in said concentrates to form sulphates; reacting the resultant slurry at a temperature above about 175° F. but below the melting point of sulphur and under a positive partial pressure of oxygen with a free oxygen bearing, oxidizing gas; continuing said reaction with said oxidizing gas to extract copper values contained in said concentrate and dissolve them in the aqueous acid leach solution and to convert sulphur bound to said copper values to elemental form; terminating said reaction when about 95% by weight of the copper content of said concentrate is extracted and while substantially all of the pyrite fraction of said concentrate remains unattacked by said leach solution to leave a residue containing elemental sulphur and pyrite; separating the said residue from the leach solution and recovering dissolved copper values from said leach solution.

3. The method according to claim 2 in which the reaction with said oxidizing gas is conducted at a temperature of about 225° F.

4. The method according to claim 2 in which the oxygen partial pressure during leaching is maintained within the range of 50 pounds per square inch to 100 pounds per square inch.

5. The method according to claim 2 in which the reaction with said oxidizing gas is terminated before more than 10 weight percent of the iron contained in the pyrite fraction of the concentrate is oxidized and dissolved in the aqueous acid leach solution.

6. The method of recovering copper values from metallic sulphide ore bulk concentrate containing highly disseminated chalcocite and pyrite fractions not readily separable by flotation which comprises the steps of dispersing said concentrate in finely divided form in an aqueous acid solution which contains about 1 mole of sulphuric acid per mole of copper present in said concentrate; reacting the resultant slurry at a temperature above about 175° F. but below the melting point of sulphur and under a partial pressure of oxygen above about 5 pounds per square inch with a free oxygen bearing, oxidizing gas; continuing said reaction under said partial pressure of oxygen to extract about 95 weight percent of the copper values contained in said concentrate and to convert sulphur bound to said copper values to elemental form; terminating said reaction before more than about 10% by weight of the iron content of the pyrite fraction of said concentrate is oxidized to leave a residue containing elemental sulphur and pyrite; separating said residue from the leach solution; recovering dissolved copper values from said leach solution while simultaneously regenerating 1 mole of sulphuric acid for each mole of copper recovered from said solution; and re-cycling copper-free solution containing said regenerated sulphuric acid to the leaching step.

7. The method according to claim 6 in which the residue from the oxidation step is treated for the recovery of elemental sulphur contained therein.

References Cited by the Examiner
UNITED STATES PATENTS

| | | | |
|---|---|---|---|
| 981,451 | 1/1911 | McKechnie | 75—101 |
| 2,746,859 | 5/1956 | McGauley | 75—115 |

DAVID L. RECK, *Primary Examiner.*

BENJAMIN HENKIN, *Examiner.*